Patented July 3, 1945

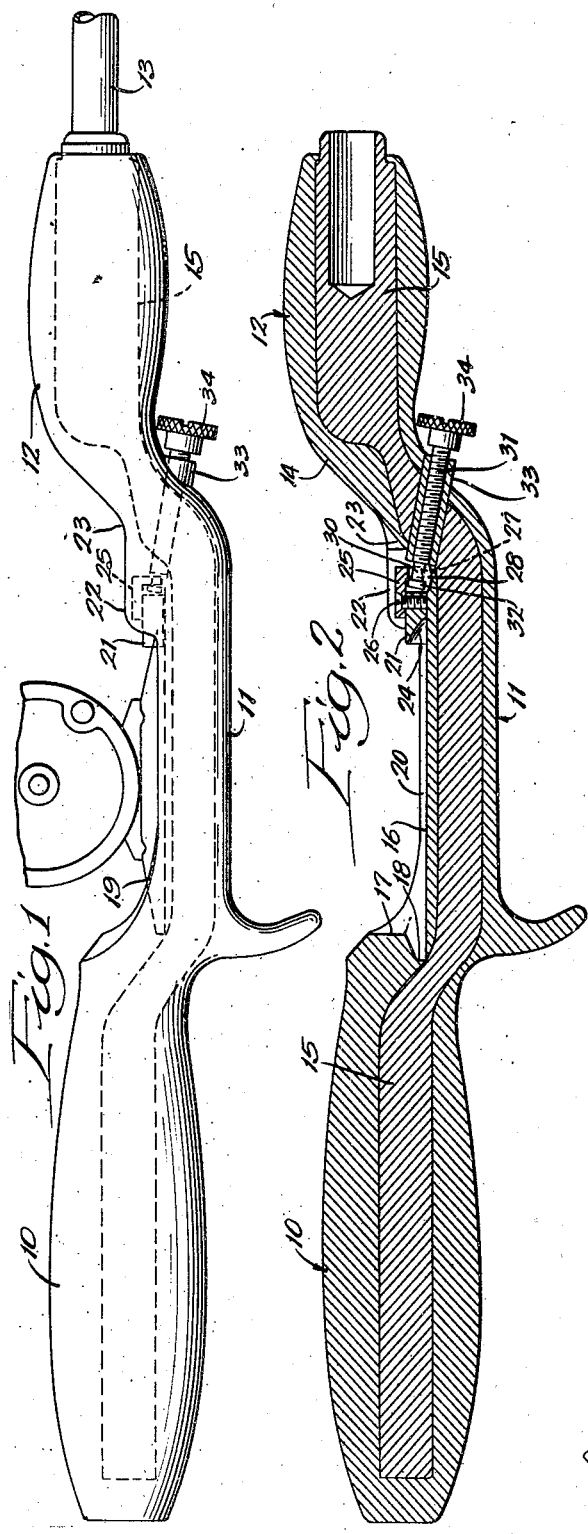

2,379,578

UNITED STATES PATENT OFFICE 2,379,578

REEL SEAT

John Heddon, Dowagiac, Mich., assignor to James Heddon's Sons, Dowagiac, Mich., a corporation of Michigan Application December 13, 1943, Serial No. 514,059

5 Claims. (Cl. 43—22)

The reel seat of the present invention is of that type which is formed in an offset in the handle of the fish rod which is provided for the purpose of centering the base of the reel substantially in line with the axis of the rod, thus paying out the line without angling the same in any appreciable degree against the line guides and thus interfering with the cast and tending to wear the line.

In mounting a reel in an offset section of the handle it has been found desirable to provide a movable clamping block of some sort for engaging one end of the base plate of the reel, but difficulty has been experienced in adjusting the block without offsetting the seat portion of the handle to an excessive degree in order to afford convenient access to the means employed for effecting such adjustment, and it is to overcome such difficulties and to improve the general structure of the reel seat that the features of the present invention have been devised.

As here shown the features of the present invention have been embodied in a handle having a metallic, reenforcing core embedded in a plastic body, but it will be understood that the invention is equally applicable to an all plastic handle. Further objects and details will appear from a detailed description of the invention in conjunction with the accompanying drawing wherein, Figure 1 is a side elevation of the handle portion of a fishing rod embodying the present invention;

Fig. 2 is a longitudinal sectional elevation of the same;

Fig. 3 is an enlarged fragmental detail in plan of the clamping block and associated parts;

Fig. 4 is a cross section on line 4—4 of Fig. 3; and

Fig. 5 is a detail of the clamping block and adjusting screw.

The handle as a whole is configured to provide a rear grip portion 10, a downwardly offset medial reel seating section 11, and a forward socket section 12 into which the butt end of a rod 13 is inserted. In the present embodiment, the handle is formed of plastic sheath 14 with an inner metal core shank 15 which substantially follows the general contour of the surrounding sheath.

The offset portion of the handle is formed to provide a smooth contact face 16 which terminates at its rear end in an abrupt shoulder 17 undercut at its base to afford a socket recess 18 adapted to receive the rear end of a reel base plate 19; and along each side of the contact face is a flange 20, thus affording a rectangular depression into which the base plate is fitted.

At the forward end of the depression is located a clamping block 21 which is slidably mounted and held in position by overhanging spaced lips 22, inwardly extending from the sides of the forward offset shouldered portion 23 of the handle. The clamping block is undercut on its inner base corner to provide a clamping socket recess 24 which stands in opposed relation to the recess 18, which two sockets in unison engage the opposite ends of the reel base plate.

The clamping block carries on its top a lug 25 which, as shown, is secured to the clamping block by a screw 26. The lug 25 extends beyond the forward end of the block and terminates in a finger 27, which is bifurcated to provide a slot 29 that straddles a groove 30 in the rear end of an adjusting screw 31. The screw 31 is provided with an enlarged inner head 32 which is disposed to the rear of the bifurcated finger with which it may engage to impart a forward movement to the block. To provide sufficient clearance for the head 32 in all adjusted positions of the screw 31, a recess 28 may be formed in the adjacent portion of the contact face 16.

The adjusting screw is threaded through an obliquely forwardly and downwardly extending sleeve 33, which, in the embodiment of the invention here shown, projects through the metallic core of the handle at the offset shoulder where the medial reel seating section merges into the forward socket section.

The oblique relationship of the sleeve and the adjusting screw to the line of travel of the clamping block constitutes an important feature of the present invention, in that it brings the outer end of the screw, which terminates in a knurled finger button 34, at a convenient distance below the overlying forward socket portion of the handle without the necessity for employing an excessive offset in the handle structure to afford adequate clearance space for the easy manipulation of the screw, which latter construction would be necessary if the screw extended forwardly in aligned relation to the line of travel of the block 21.

Moreover, by threading the screw through a fixed portion of the handle (sleeve in the present instance), rather than into the clamping block itself, the length of threading can be advantageously extended and the block will be relieved from tendency to turn or twist as the screw is rotated and permitted to ride smoothly and freely along the mounting provided therefor. The employment of the slotted finger permits the engaging end of the screw to move vertically within the slot while imparting in or out movements to the clamping block so that no binding or cramping of the parts will occur during the clamping or releasing of the reel.

I claim:

1. In a reel seat of the character described, the combination of a handle having a downwardly offset medial portion provided on its upper surface with a socket for the base plate of a reel, said socket being provided at its rear end with a recess for the reception of the rear end of the base plate, a longitudinally movable clamping block at the forward end of said socket recess configured to receive the forward end of the base plate, a vertically slotted member at the forward end of the block, and an obliquely downwardly and forwardly extending adjusting screw, threaded through a fixed portion of the handle at the forward end of the offset medial portion thereof, to bring the forward end of the screw exteriorly of and at a level below the socket of the handle, the screw at its rear inner end having rotatable and vertically movable engagement with the slotted member on the clamping block to impart fore and aft adjustments thereto.

2. In a reel seat of the character described, the combination of a handle having a downwardly offset medial portion provided on its upper surface with a socket terminating at its rear end in an undercut shoulder affording a recess for the reception of the rear end of the base plate, a longitudinally movable clamping block at the forward end of the base plate, a lug outstanding from the block and carrying a downwardly extended slotted finger spaced from the forward end of the block, and an obliquely downwardly and forwardly extending adjusting screw, threaded through a fixed portion of the handle at the forward end of the offset medial portion thereof, to bring the forward end of the screw exteriorly of and at a level below the socket of the handle, the screw at its rear inner end having rotatable and vertically movable engagement with the slotted finger on the clamping block to impart fore and aft adjustments thereto.

3. In a reel seat of the character described, the combination of a handle having a downwardly offset medial portion provided on its upper surface with a socket for the base plate of a reel, said socket terminating at its rear end in an undercut shoulder affording a recess for the reception of the rear end of the base plate, a longitudinally movable clamping block at the forward end of said socket recess configured to receive the forward end of the base plate, a vertically slotted finger at the forward end of the block, and an obliquely downwardly and forwardly extending adjusting screw, threaded through a fixed portion of the handle at the forward end of the offset medial portion thereof, to bring the forward end of the screw exteriorly of and at a level below the socket of the handle, the screw at its rear inner end having formed therein a circumferentially grooved portion entered within the slot in the finger, and having behind the slot an enlarged head engaging the margins of the finger adjacent said slot, to afford rotatable and vertically movable engagement therewith in imparting fore and aft adjustments to the clamping block.

4. In a reel seat of the character described, the combination of a handle having a downwardly offset medial portion provided on its upper surface with a socket for the base plate of a reel, said socket terminating at its rear end in an undercut shoulder affording a recess for the reception of the rear end of the base plate, a longitudinally movable clamping block at the forward end of said socket recess configured to receive the forward end of the base plate, a vertically slotted member at the forward end of the block, an obliquely downwardly and forwardly extending screw, and an obliquely disposed interiorly threaded sleeve extending through a fixed portion of the handle at the forward end of the offset medial portion thereof, and having the adjusting screw threaded through the sleeve to bring the forward end of the screw exteriorly of and at a level below the socket of the handle, the screw at its rear inner end having rotatable and vertically movable engagement with the slotted member on the clamping block to impart fore and aft adjustment thereto.

5. In a reel seat of the character described, the combination of a handle having a downwardly offset medial portion provided on its upper surface with a socket for the base plate of a reel, said socket terminating at its rear end in an undercut shoulder affording a recess for the reception of the rear end of the base plate, a longitudinally movable clamping block at the forward end of said socket recess configured to receive the forward end of the base plate, a vertically slotted finger at the forward end of the block, an obliquely downwardly and forwardly extending screw, and an obliquely disposed interiorly threaded sleeve extending through a fixed portion of the handle at the forward end of the offset medial portion thereof, and having the adjusting screw threaded through the sleeve to bring the forward end of the screw exteriorly of and at a level below the socket of the handle, the screw at its rear inner end having formed therein a circumferentially grooved portion extending within the slot in the finger, and having behind the slot an enlarged head engaging the margins of the finger adjacent said slot, to afford rotatable and vertically movable engagement therewith in imparting fore and aft adjustments to the clamping block.

JOHN HEDDON.